May 14, 1963 — L. D. MILLIKIN — 3,089,457
LOW AIR SPEED INDICATOR

Filed Aug. 5, 1960 — 2 Sheets-Sheet 1

INVENTOR.
LEE DOUGLAS MILLIKIN
BY
*Paul H. Johnson*
ATTORNEY

May 14, 1963 — L. D. MILLIKIN — 3,089,457
LOW AIR SPEED INDICATOR
Filed Aug. 5, 1960 — 2 Sheets-Sheet 2

*INVENTOR.*
LEE DOUGLAS MILLIKIN
BY
ATTORNEY

United States Patent Office 3,089,457
Patented May 14, 1963

3,089,457
LOW AIR SPEED INDICATOR
Lee D. Millikin, 124 S. 107th East Ave., Tulsa, Okla.
Filed Aug. 5, 1960, Ser. No. 47,631
4 Claims. (Cl. 116—112)

This invention relates to a low air speed indicator. More particularly, the invention relates to a device for mounting on airplanes wherein low air speed of the airplane will be indicated by a warning to advise the pilot of the approach of stall conditions.

Airplanes are designed to fly, under given load conditions, at predetermined minimum air speeds. Regardless of the attitude of the plane, as long as the speed of the plane relative to the air through which it is moving is sufficiently great, then the airplane can be said to be flying. When the speed of the plane relative to the air falls below a predetermined point the lift of the wings of the airplane are not sufficient to overcome the effect of gravity and the plane will no longer be flying but instead, will begin to fall. At the point where the lift of the wings become insufficient to overcome the effect of gravity a "stall" occurs.

For this reason it is highly important for a pilot of a plane to know when the plane is approaching stalling air speed. In taking the plane off the ground, the pilot may wish to know when flying speed is reached wherein the plane is ready to leave the runway. In normal flying also, especially student flying, and in performing the normal aircraft maneuvers such as turns, it is helpful for the pilot to know when stalling speed is approaching.

It is therefore an object of this invention to provide a device adaptable for use on airplanes to indicate when stalling speeds are being approached.

Another object of this invention is to provide a low air speed indicator for use on airplanes which will supply an audible warning when a predetermined low air speed of the plane is reached.

Another object of this invention is to provide a low air speed indicator for use with aircraft which will be adjustable so that the speed at which a warning will be given may be adjusted.

Another object of this invention is to provide a low air speed indicator which will be inexpensive to manufacture and which will be durable and dependable in its operation.

Another object of this invention is to provide a device for airplanes which will produce a warning when a predetermined low air speed is approaching and will not require connection to an external power source.

These and other objects and a better understanding of the invention may be had by referring to the following description and claims taken in conjunction with the attached drawings, in which:

Figure 1:
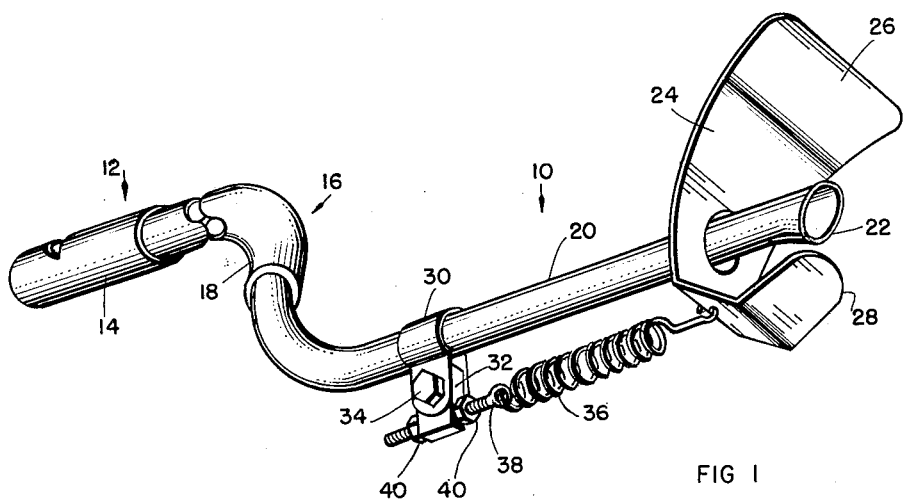
FIGURE 1 is an isometric view of the low air speed indicator of this invention.

The invention may be broadly divided into three elements having three separate but interdependent functions. The first element is the detector portion, indicated generally by the numeral 10 in FIGURE 1. Detector element 10 is positioned to the exterior of the aircraft in a manner to engage the air through which the airplane is moving. The second element may be generally referred to as the indicator element and is indicated by the numeral 12. Indicator element 12 is positioned within the cabin or cockpit of the airplane to which the detector portion 10 is attached to provide a warning when low air speed is being approached. Indicator element 12 may be either a visual or audible indicator. In FIGURE 1 a whistle 14 is shown so that indicator element 12 is, in this view, an audible indicator. Connecting the detector element 10, mounted to the exterior of the aircraft, with indicator element 12, mounted in the cockpit or cabin of the aircraft, is a communication element 16 consisting of a tube 18. Tube 18 may be of any flexible material such as brass, aluminum, plastic or rubber.

The detector element 10 consists of an open ended tube member 20 which is positioned so that its tubular axis points substantially in the direction in which the aircraft moves. In this position air is disposed to enter the open end 22 of tube member 20 and flow through tube 18 to indicator element 12.

A gate member 24 is pivoted in relation to tube member 20. Gate member 24 has an integrally formed wing portion 26, a pivot 27, and an integrally formed flapper portion 28. The function of these elements will be described in greater detail subsequently.

Affixed to tube element 20 is a bracket 30 supporting a small adjusting block 32 with a nut 34. A spring 36 is provided having one end affixed to flapper portion 28 of gate element 24. The other end of spring 36 is affixed to an adjusting eye bolt 38 which extends through an opening in adjusting block 32. The tension of spring 36 is altered by adusting nuts 40 on adjusting eye bolt 38.

Figure 2:
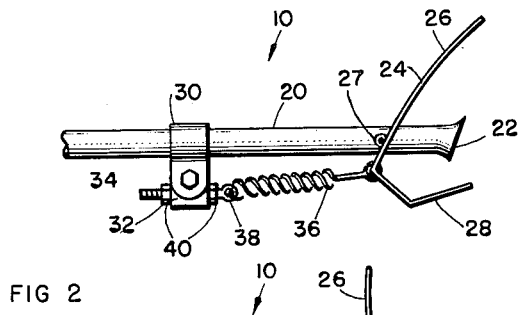
FIGURE 2 is a side view on a reduced scale of the low air speed indicator of this invention, showing the attitude of the mechanism when the air speed of the airplane to which it is fixed is below the predetermined minimum.
Figure 3:
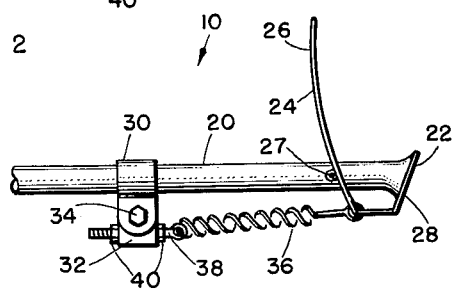
FIGURE 3 is a side view on a reduced scale of the low air speed indicator of this invention showing the attitude of the device when the air speed through which the airplane is moving is above the predetermined minimum.

The functioning of the low air speed indicator of this invention is best shown in FIGURES 2 and 3. FIGURE 2 shows the attitude of the gate element 24 when the plane (not shown) having detector element 10 affixed is stopped or is moving through the air slowly. When insufficient impact of the air impinges against wing portion 26 of gate element 24, the tension of spring 36 pivots the wing portion 26 and flap portion 28 downward about pivot 27. This leaves the open end 22 of tube member 20 uncovered so that a portion of the air through which the plane is moving is disposed to enter the opening 22 and flow through tube member 20 and tube 18 to indicator element 12. When sufficient air speed is attained the impact of the air on wing portion 26 will overcome the tension of spring 36, tilting gate element 24 so that flapper portion 28 is pivoted to cover opening 22 of tube element 20. Therefore, as more air speed is attained by the aircraft, the opening of tube 20 will be covered and substantially no air will be permitted to enter the tube 20.

The air speed required to pivot gate member 24 is determined by the tension of spring 36. By manipulating nuts 40 the tension of spring 36 can be adjusted so that as the speed of the aircraft decreases gate member 24 will pivot at the particular air speed critical for the plane on which the air speed indicator 10 is attached. For instance, if the plane to which the air speed indicator 10 is attached has a stall speed of sixty miles per hour, then spring 36 may be adjusted so that air impact on wing portion 26 of at least sixty-two miles per hour is required to overcome the tension of spring 36. In this manner, when the air speed of the plane drops to sixty-two miles per hour the tension of spring 36 will overcome the force of wing portion 26 to pivot gate element 24 so that the open end 22 of tube member 20 is exposed permitting air to pass through whistle 14, sounding a warning. This will indicate to the pilot that the plane is approaching the minimum flying speed.

Another means of adjusting the tension on spring 36 is by loosening bolt 34 and moving bracket 30 axially along tube member 20.

Figure 4:
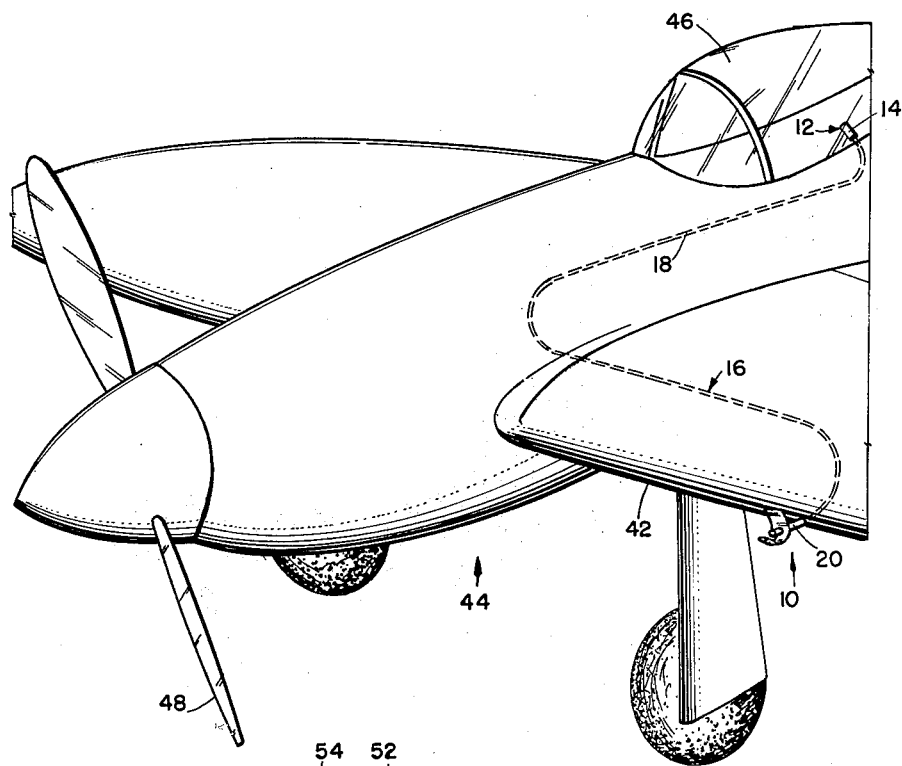
FIGURE 4 is an isometric view of a portion of an airplane having the low air speed indicator device of this invention attached.

FIGURE 4 shows the air speed indicator element 10 mounted on the forward edge of wing 42 of airplane 44. Communication element 16 connects the tube member 20 to indicator element 12 positioned in plane cockpit 46. Detector element 10 may be positioned on the exterior surface of airplane 44 in a variety of places as long as it is exposed to substantially the full impact of the air through which the plane 44 travels. Detector element 10 must not be positioned so as to receive the impact of the air moved by propeller 48 since this would give an incorrect indication of the true air speed of the plane.

As previously indicated, the indicator element 12 may be either a visual or audible indicator. A simple audible indicator consists of a small whistle 14 affixed to tube 18. In place of whistle 14 an audible indicator 12 may be a small air driven siren or any other noise producing element actuated by the flow of air through tube 18.

Figure 5:
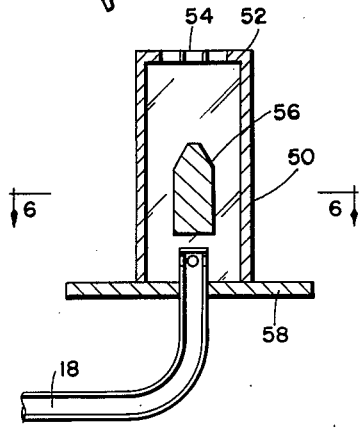
FIGURE 5 is a cross-sectional view on an enlarged scale of a visual indicator adaptable for use with the low air speed indicator of this invention.
Figure 6:
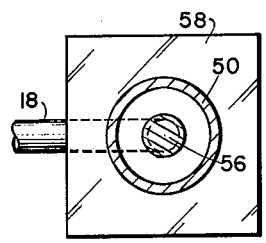
FIGURE 6 is a cross-sectional view on an enlarged scale of the visual indicator taken along the line 6—6 of FIGURE 5.

One example of a visual indicator is shown in FIGURES 5 and 6. Tube 18 terminates in the lower portion of an upright transparent cylindrical member 50. Cylindrical member 50 has a top member or cap 52 supported thereto having openings 54 formed therein. A plug member 56 is slideably positioned within upright cylindrical member 50. Air from tube 18 escapes to the interior of cylindrical member 50 and out through openings 54 in top member 52. The upward movement of the air through cylindrical member 50 causes plug member 56, which is made of a light material such as foam plastic, to rise to the top of cylindrical member 50. Thus, with the airplane in flight, when gate member 24 pivots open by the effect of tension of spring 36 air enters the end 22 of tube member 20 and flows through tube 18 and into the interior of cylindrical member 50, raising plug member 56. When plug 56 is seen floating at the top of cylindrical member 50, indication is given that the plane is approaching a stall speed.

Plug member 56 will be of a bright luminescent color. It may be designed so that the effect of the air moving through cylindrical member 50 will cause it to wobble at the top of the cylinder 50 to attract the attention of the pilot. Plug member 56 may be in the shape of a ball. Cylindrical member 50 is positioned on a base 58 whereby the visual indicator may be easily mounted in cockpit 46 of airplane 44.

The visual indicator of FIGURES 5 and 6 is by way of example only and many other means of providing a visual indication when air flows through tube 18 will be apparent.

Low air speed indicators have been available for some time for use on aircraft. However, the types available are not readily adaptable to small aircraft, either because they are prohibitively expensive, or because they require electrical facilities not readily obtainable. The ingenious design of this invention provides a dependable and accurate, yet inexpensive, low air speed indicator adaptable for use on planes which do not have extensive electrical equipment. The device is extremely safe in that it is independent of any of the other control systems of the airplane and is therefore practically fail proof.

Although this invention has been described with a certain degree of particularity it manifests many changes may be made in the details of construction and the arrangement of components without departing from the spirit and scope of this disclosure.

I claim:

1. A low air speed indicating device for use on aircraft comprising, a tubular member having an air-operated indicating element on one end and a control valve on the other open end, said control valve being intermediately transversely pivoted on said tube, said control valve having an air contacting portion on one of its ends and a valve portion on its other end which is alternatively in coacting engagement with the open end of said tubular member, and a spring means between said control valve and said tubular member normally urging said valve portion away from said open end.

2. A low air speed indicating device according to claim 1 wherein said spring means between said control valve and said tubular member, normally urging said valve portion away from said open end, includes tension adjusting means.

3. A low air speed indicating device according to claim 1 wherein said air operated indicating element includes a sound producing element.

4. A low air speed indicating device according to claim 1 wherein said indicating element on one end of said tubular member includes a visual indicating element.

References Cited in the file of this patent

UNITED STATES PATENTS

| 1,227,842 | Sellin | May 29, 1917 |
| 2,287,497 | Rockefeller | June 23, 1942 |
| 2,499,284 | Smith | Feb. 28, 1950 |
| 2,637,294 | Gehrig | May 5, 1953 |